(12) United States Patent
Hauser (10) Patent No.: US 8,139,263 B2
(45) Date of Patent: Mar. 20, 2012

(54) SYSTEMS AND METHODS FOR PRINTING ARTWORK CONTAINING OVERLAPPED INKS

(75) Inventor: Rebecca Hauser, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1237 days.

(21) Appl. No.: 11/291,805

(22) Filed: Nov. 30, 2005

(65) Prior Publication Data

US 2007/0121131 A1    May 31, 2007

(51) Int. Cl.
*G06F 15/00* (2006.01)
(52) U.S. Cl. ....................................................... 358/1.9
(58) Field of Classification Search .................. 358/1.9, 358/518, 520; 382/167; 345/600
See application file for complete search history.

(56) References Cited

U.S. PATENT DOCUMENTS

| | | | |
|---|---|---|---|
| 5,687,303 A | 11/1997 | Motamed et al. | |
| 5,854,882 A | 12/1998 | Wang | |
| 6,020,897 A | 2/2000 | Carlsen et al. | |
| 6,025,927 A | 2/2000 | Honma | |
| 6,049,339 A | 4/2000 | Schiller et al. | |
| 6,230,174 B1 | 5/2001 | Berger et al. | |
| 6,313,847 B1 | 11/2001 | Carlsen | |
| 6,456,295 B1 | 9/2002 | Schiller | |
| 6,515,675 B1 | 2/2003 | Bourdev | |
| 6,678,072 B1 | 1/2004 | Matsuoka et al. | |
| 6,720,977 B1 | 4/2004 | Bourdev et al. | |
| 6,825,852 B1 | 11/2004 | Hamburg | |
| 2003/0043231 A1* | 3/2003 | Byers et al. | 347/43 |
| 2003/0174187 A1 | 9/2003 | Greive | |
| 2004/0086156 A1 | 5/2004 | Furukawa et al. | |
| 2004/0125404 A1 | 7/2004 | Isshiki | |
| 2005/0083346 A1 | 4/2005 | Takahashi et al. | |
| 2007/0121160 A1 | 5/2007 | Markovic | |

FOREIGN PATENT DOCUMENTS

| | | |
|---|---|---|
| DE | 4003300 A1 | 8/1991 |
| EP | 0256660 B1 | 10/1992 |
| WO | WO-2007064851 A2 | 6/2007 |
| WO | WO-2007064851 A3 | 6/2007 |
| WO | WO-2007064915 A2 | 6/2007 |
| WO | WO-2007064915 A3 | 6/2007 |

OTHER PUBLICATIONS

"International Application No. PCT/US 06/45940, International Search Report Oct. 5, 2007", 4 pgs.
"International Application No. PCT/US 06/45940, Written Opinion Oct. 5, 2007", 5 pgs.
"International Application Serial No. PCT/US2006/046041 Int'l Preliminary Examination Report mailed May 13, 2009", 07 pgs.
"German Application Serial No. 112006003239.9, Office Action mailed Jan. 26, 2010", 8 pgs.

* cited by examiner

*Primary Examiner* — Benny Tieu
*Assistant Examiner* — Jeremiah Bryar
(74) *Attorney, Agent, or Firm* — Schwegman, Lundberg & Woessner, P.A.

(57) ABSTRACT

Systems and methods provide a mechanism to print documents having artwork with overlapping inks. One aspect of the systems and methods includes sending the document to a printer having a printer control system. The printer control system detects overlapping areas, and flattens the artwork into separate atomic regions. The system determines whether the colors in the atomic regions are available on the printer as process colors or spot colors. Unavailable spot colors are converted to process colors, and blended into a single process color. Available spot colors are retained.

16 Claims, 7 Drawing Sheets

SYSTEMS AND METHODS FOR PRINTING ARTWORK CONTAINING OVERLAPPED INKS

FIELD

The embodiments relate generally to processing electronic artwork, and more particularly to printing such artwork containing overlapped inks.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

It is often desirable to include color artwork and text in documents. Color can make a document more interesting and more informative. In addition, many software applications that prepare documents and artwork provide many mechanisms to specify color and effects using color.

Color specifications in a document typically use one of two types of color, process colors or spot colors. A process color is a color that that is specified and printed using a set of colorants that define a standard color space, such as red, green, and blue (RGB colors space) or cyan, magenta, yellow and black (CMYK color space). Spot colors are colorants that are specified and printed as individual inks.

In traditional print workflows, printing devices have little or no ability to preserve the color appearance of artwork using spot color inks that the printing device does not have, especially when the artwork contains overlapped colors. Either spot color is removed and replaced with process color before printing, typically without reliable knowledge of the final printing device, or the artwork is printed as-is with poor results.

Artwork using an arbitrary set of spot colors may be printed as-is. Using a page description language such as PostScript, with its ability to accept fallback color descriptions for unavailable inks, the appearance of unavailable spot colors can be preserved reasonably well, as long as they are used only as opaque objects with no color overlapping, and as long as the application that produced the artwork used fallback colors that are handled well by the final printing device. This approach has the advantage of keeping the artwork description portable, but the restrictions noted above are unacceptable for most real-world artwork.

Alternatively, the artwork may be preprocessed and converted to use process color equivalents only instead of the original spot colors before printing. The spots are simply replaced with process color equivalents. The process colors may or may not resemble the original spot color inks when printed, depending on how they were selected, and whether the artwork is printed on a device matching the assumed output color characteristics. Overlapped process color areas may or may not look somewhat similar to the overlapped spot colors, depending on the combination of process colors in the area.

Additionally, preprocessing in general may increase the file management overhead of print workflows, because the preprocessing step typically creates one or more significantly larger new files that may need to be managed.

SUMMARY

Systems and methods provide a mechanism to print documents having artwork with overlapping inks. One aspect of the systems and methods includes sending the document to a printer having a printer control system. The printer control system detects overlapping areas, and flattens the artwork into separate atomic regions. The system determines if the colors in the atomic regions are available on the printer as process colors or spot colors. Unavailable spot colors are converted to process colors, and blended into the device process color space. Available spot colors are retained and printed as individual inks.

The present application describes systems, methods, and computer-readable media of varying scope. In addition to the aspects and advantages of the present application described in this summary, further aspects and advantages of the embodiments will become apparent by reference to the drawings and by reading the detailed description that follows.

DETAILED DESCRIPTION

In the following detailed description of example embodiments, reference is made to the accompanying drawings which form a part hereof, and in which is shown by way of illustration specific example embodiments in which the invention may be practiced. These embodiments are described in sufficient detail to enable those skilled in the art to practice the embodiments of the invention, and it is to be understood that other embodiments may be utilized and that logical, mechanical, electrical and other changes may be made without departing from the scope of the detailed description.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

Figure 1:
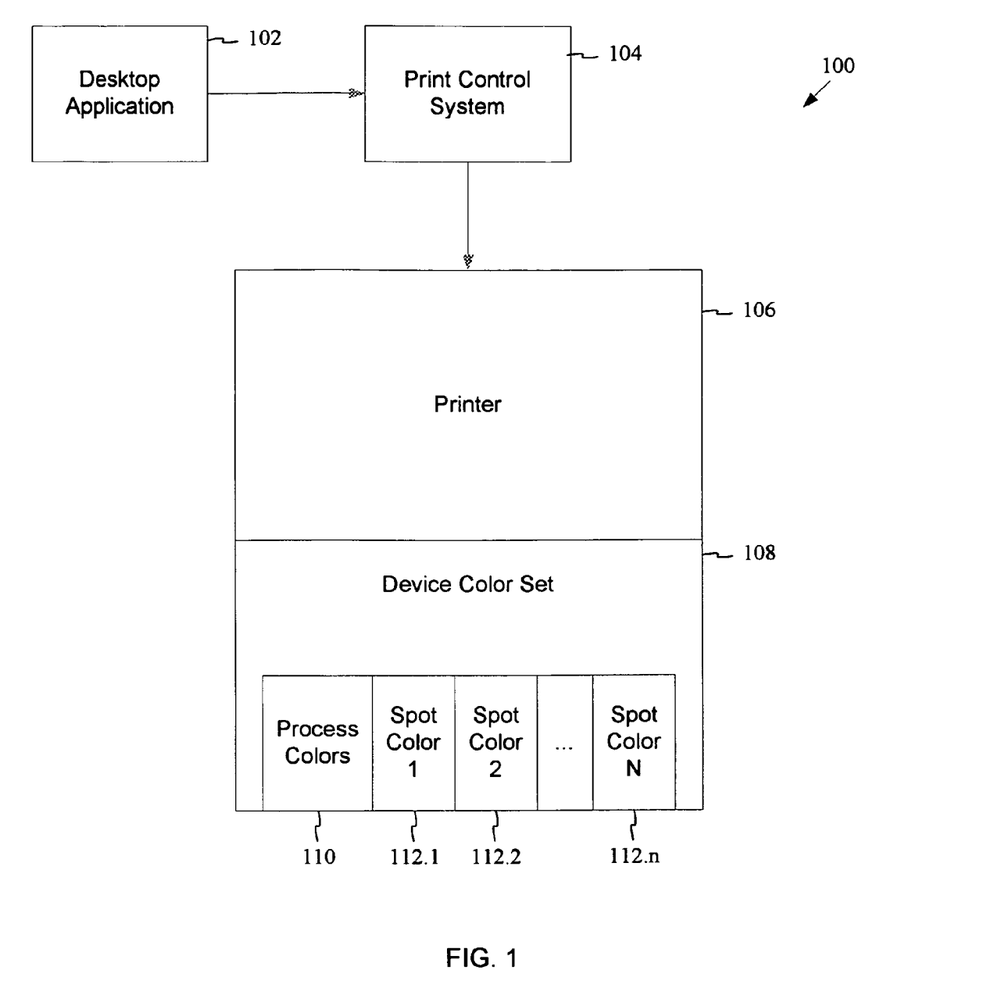
FIG. 1 is a block diagram illustrating an example environment in which embodiments of the invention may be practiced.

FIG. 1 is a block diagram illustrating example elements of a printing workflow 100 incorporating embodiments of the invention. In the example shown, the workflow 100 includes a desktop application 102, a first printer control system 104, and a printer 106.

Figure 2:
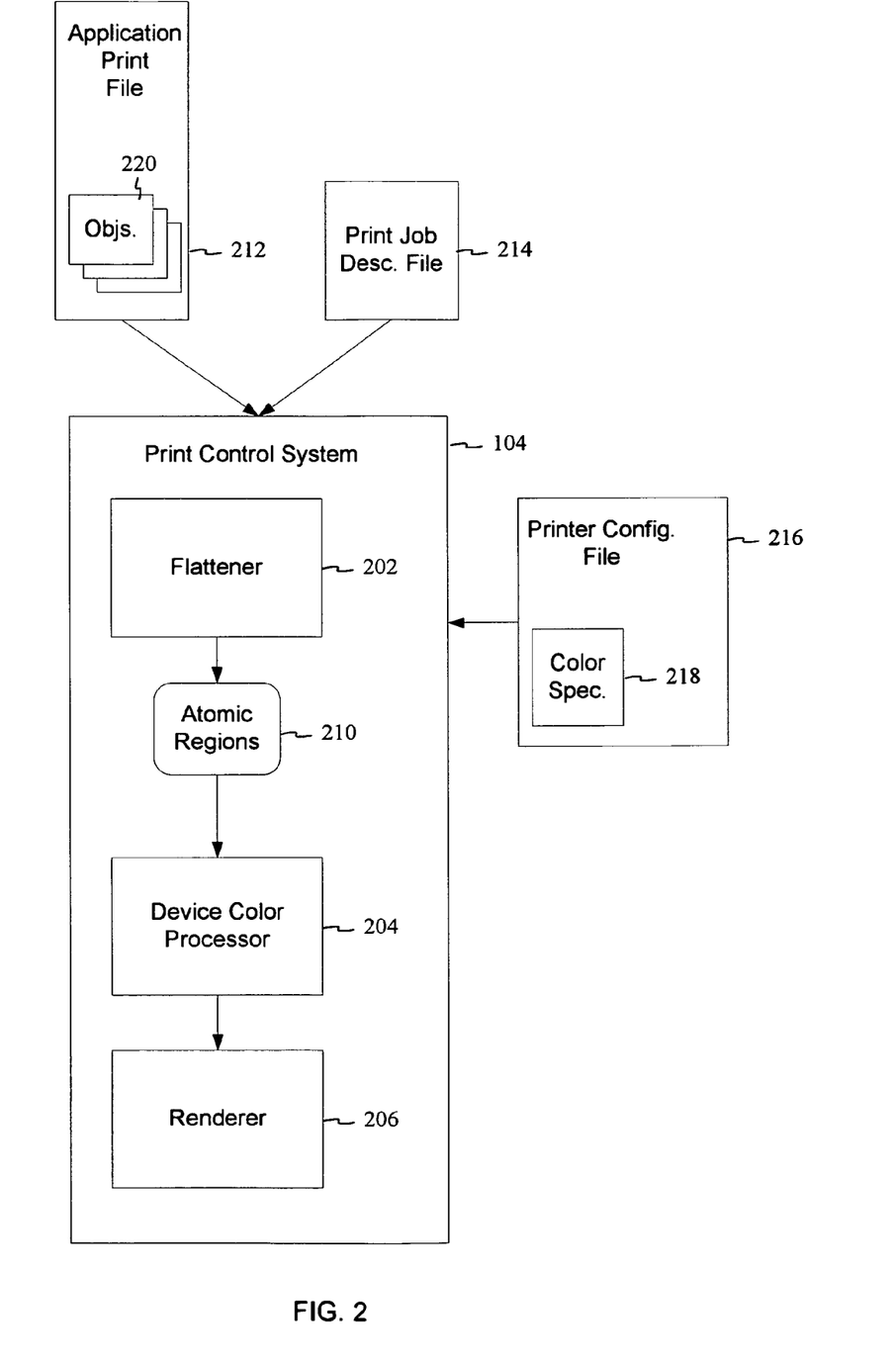
FIG. 2 is a block diagram illustrating major logical components of a printing system according to example embodiments of the invention.

Desktop application 102 comprises an application that provides a mechanism for a user to design the layout of a document containing various forms of print objects 220 (see FIG. 2). The print objects 220 may include varying combinations of text, graphics and/or images (e.g., artwork). The desktop application 102 will typically provide a way for a user to control the size, position, and orientation of the print objects 220 in the document. As a result of the placement of print objects 220 in the file, some portions of one print object may overlap other portions of another print object. Examples of such desktop applications include the Adobe Acrobat® family of document processing applications, InDesign®, Photoshop®, Creative Suite, Illustrator®, FrameMaker® and PageMaker® applications, all available from Adobe Systems Inc. of San Jose, Calif. However, the embodiments are not limited to any particular document creation application and in alternative embodiments the document creation application may be any word processing application, image processing application, or other application that operates on electronic text and images. As an example, desktop application 102 may comprise the Microsoft® Publisher application available from Microsoft Corporation of Redmond, Wash.

Desktop application 102 is typically capable of specifying spot colors for print objects 220 in documents created using the desktop application 102. Unfortunately as discussed above, there are problems involved with using spot color in print objects 220, and further issues occur if any of the spots are overlapped. For example, print objects 220 with overlapped spot color objects in previous desktop systems is generally preprocessed if one or more of the spot colors may not be available when printing. Such preprocessing creates its own set of issues. The spot color configuration of the output device must typically be known to the preprocessing step in advance, otherwise the preprocessing step will remove inks unnecessarily. Further, the color characteristics of the output device must be known intimately to the preprocessing step in advance, otherwise the appearance of the replaced spots may be inaccurate.

The actions involved in the preprocessing provided in previous desktop systems results in the artwork being targeted for a particular device and making the artwork less transportable. In these previous systems, attempting to send the artwork to a different device may thus result in inaccurate printing of the artwork. In addition, while desktop application preprocessing using flattening helps preserve an overlapped appearance, it introduces new artifacts and if anything increases the dependency on accurate device knowledge and the limitations on where the result can be printed.

Print control system 104 includes hardware and software that provides front-end processing of files to be printed on printer 106. Print control system 104 receives one or more files from desktop application 102 over a network or other communications interface (not shown), processes the file, and then sends the file to be printed on printer 106. Print control system 104 may be a separate workstation that is communicably coupled to printer 106, or it may be integrated within printer 106. Further details on print control system 104 are provided below with reference to FIG. 2.

Printer 106 receives data processed by print control system 104 and provides printed copies of the file or files sent to print control system 104 by desktop application 102. Printer 106 may be an inkjet printer, a laser printer, an offset printer, or any other type of printer known in the art. Printer 106 includes a device color set 108 comprising available colors on the printer.

Device color set 108 may include inks for two general types of colors, process colors 110 and spot colors 112. An ink may be referred to as a colorant, and is typically identified by a name. A process color is a color that is specified and printed using a combination of a set of standard inks that are designed to be used together. Typically the set of standard inks may be referred to as a color space. Example color spaces include the RGB (Red Green Blue) color space and the CMYK (Cyan Magenta Yellow Black) color space. Process colors are formed using specified levels of colorants in the color space. Different colors will have differing levels of each of the component colors from the color space.

Printer 106 may also provide one or more spot colors 112.1 to 112.n. A spot color is an ink that is specially made to produce a particular color and is typically not part of the inks in the process colors 110. Inks for spot colors are available from various systems. Examples of such systems include the Pantone, TruMatch, Toyo Inks, and Focoltone color systems. Spot colors may be used when a precise color is required that is difficult or more expensive to produce then a process color, or to provide accurate color reproduction on a particular type of paper. Additionally, spot colors may provide effects not available in process colors such as metallic or fluorescent effects. Various shades or tints of a spot color may be created by varying the level or percentage of the spot color used.

FIG. 2 is a block diagram illustrating major components of a print control system 104 according to an example embodiment. In an example embodiment, print control system 104 includes flattener 202, device color processor 204 and renderer 206.

Print control system 104 receives an application print file 212 from a desktop application 102. The application print file 212 defines one or more pages to be printed on printer 106. The application print file 212 may contain object definitions, raster images, or other items that are to be printed. In some embodiments, the application print file 212 is a Postscript file. In alternative embodiments, the application print file may be a PDF file. The embodiments are not limited to a particular type of application print file 212.

In some embodiments, print control system 104 may read a print job description file 214. The print job description file 214 may contain parameters relevant for printing application print file 212. For example, print job description file 214 may contain parameters specifying the number of copies to be printed, the location of application print file 212 in a file system, an enlargement or reduction percentage to be applied, or other print parameters.

In an example embodiment, print control system 104 reads a printer configuration file 216. Printer configuration file 216 contains parameters relevant to a particular printer 106. For example, printer configuration file 216 may specify a resolution or resolutions that the printer is capable of. In addition, printer configuration file 216 contains a color specification 218. The color specification 218 contains data indicating the color or colors that the printer is capable of printing, referred to as available device colors. The device colors may include spot colors and process colors. In an example embodiment, the color or colors may be specified by name, referred to as a device color name. However, other mechanisms for specifying a color may be used and are within the scope of the embodiments. In addition, color specification 218 may contain data identifying certain colors as equivalent to other colors. These colors may be referred to as equivalent color names. In some embodiments, an equivalent color may be identified by data that specifies certain named colors as having device process color equivalents. For example, the data may identify device-specific process color equivalents for spot color inks. In some embodiments, device process color equivalents some or all of a spot ink set (e.g., Pantone, Toyo, Focaltone etc.) may be specified. This is desirable, because each printer typically has different process color characteristics.

Printer configuration file 216 in some embodiments may be created and/or maintained by a user such as a system administrator. In alternative embodiments, a printer configuration may be read directly from the printer 106.

When an application print file 212 is received by a printer, it is processed by flattener 202. Flattener 202 operates to identify areas in a print document that contain overlapping regions. The regions that overlap may then be separated and redefined as atomic (e.g., independent) regions 210. Depending on the transparency or opacity of the overlapping and overlapped print objects 220 and on the properties of the spot color inks used by the print objects 220, the overlapping region may be printed in colors that are different from both the overlapping and overlapped print objects 220. In other words, the color in the overlapping region may be printed as a combination of the colors in the overlapping and overlapped region, the exact combinations being determined by the degree of transparency of the overlapping and overlapped print objects 220 and the properties of the spot color inks used by the print objects 220. The spot color properties may include ink laydown order of the emulated spots, ink type (e.g., normal, metallic, varnish, dieline, ink neutral density, etc.).

Figure 3A:
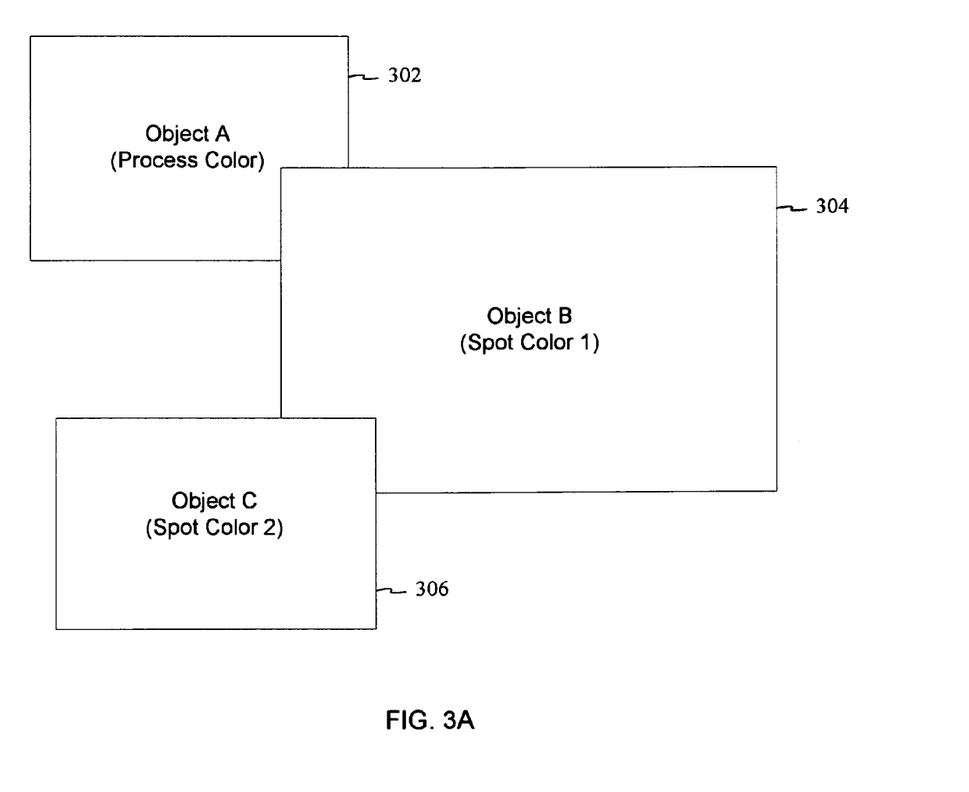
FIG. 3A-3C are block diagrams illustrating example elements of a document to be printed as the elements go through a flattening process.
Figure 3B:
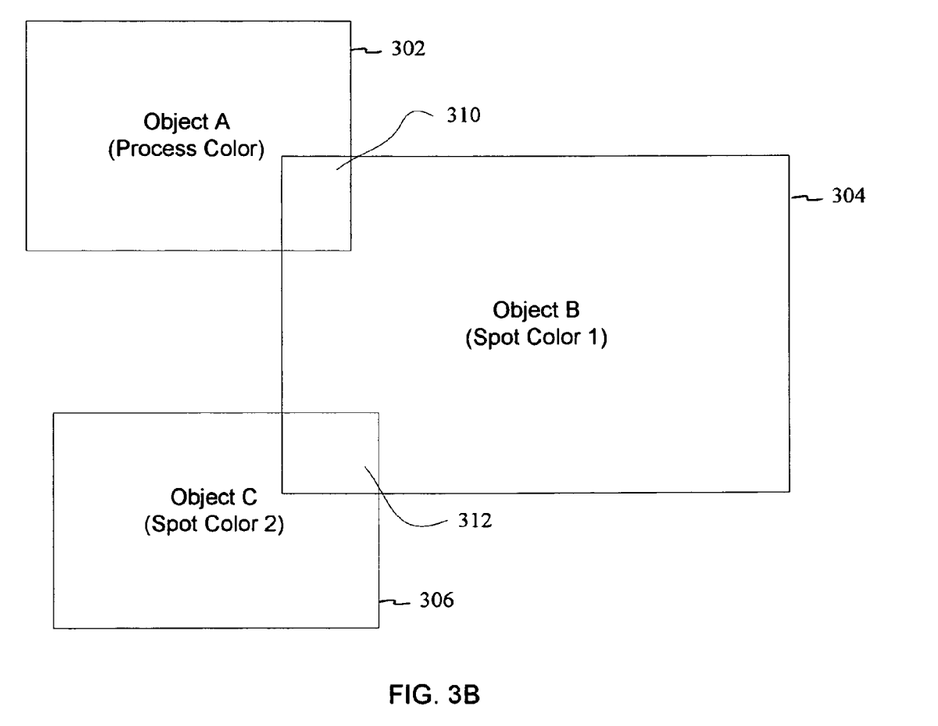
Figure 3C:
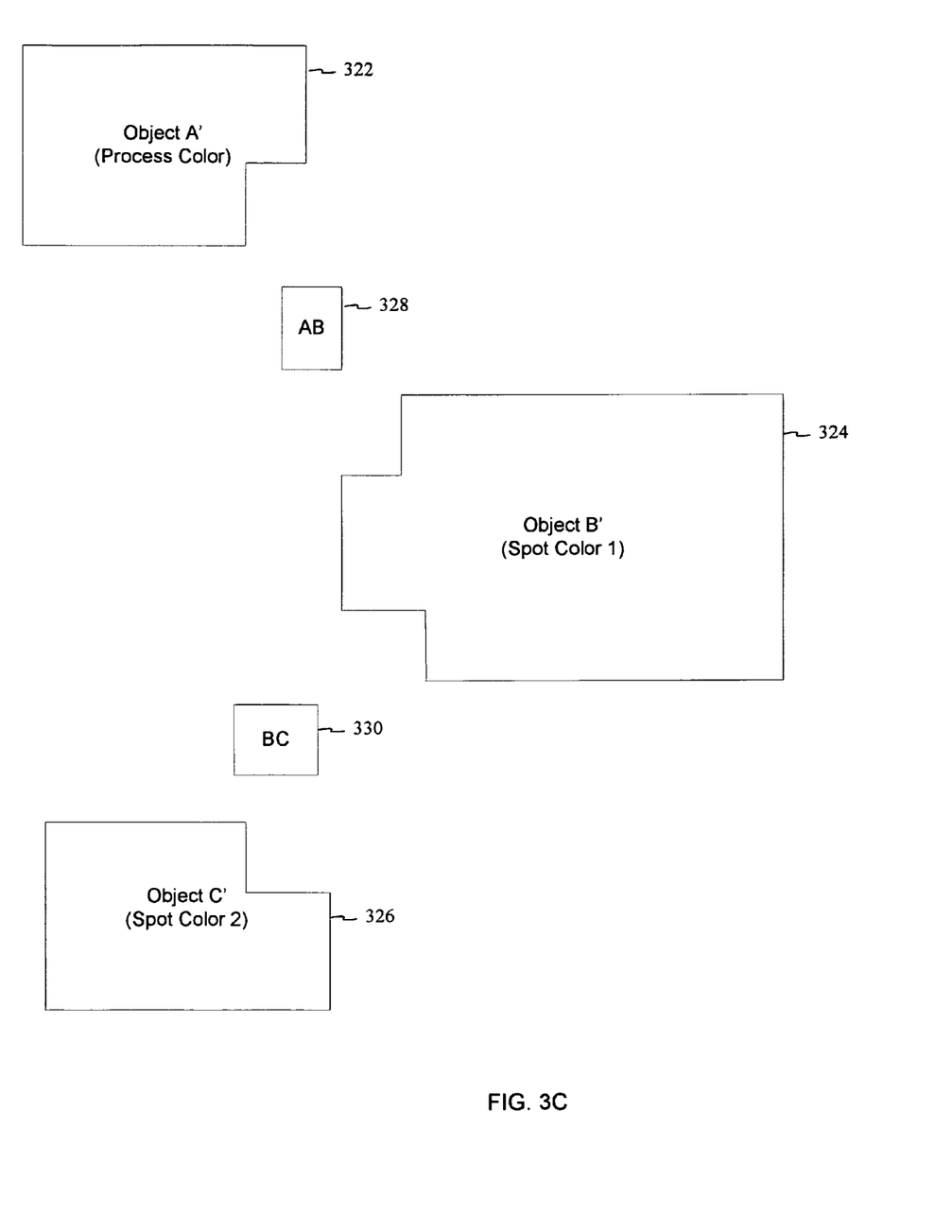

FIGS. 3A-3C provide an example of the operation of flattener 202. FIG. 3A represent three individual print objects, object A 302, object B 304 and object C 306. Note that object C overlaps object B, and object B in turn overlaps object A. Flattener 202 identifies the overlapping regions, which are identified in FIG. 3B as regions 310 and 312.

FIG. 3C illustrates the final determination of atomic regions 210 of flattener 202 with respect to example objects A, B and C. As illustrated, flattener 202 creates five objects from the initially received three objects. In the example, object A' 322 represents object A with the overlapping region 310 removed, object B' 324 represents object B with the overlapping regions 310 and 312 removed, object C' 326 represents object C with the overlapping region 312 removed, object AB 328 represents the overlapping region 310 and object BC represents the overlapping region 312. Note that the object in FIG. 3C are shown separated to indicate their respective shapes. In actuality, the objects would maintain the positions as illustrated in FIG. 3B.

Those of skill in the art will appreciate that the example shown in FIGS. 3A-3C is just one example of an infinite number of combinations of objects and overlap characteristics. Multiple objects may overlap one another and the objects may have varying shapes and sizes.

Returning to FIG. 2, flattener 202 includes for each atomic region in regions 210 a list of print object colors found in the atomic region. The print object colors for particular region will depend on the colors of the print objects that overlap and the degree of transparency of the overlapping object. In some embodiments, the set of print object colors in an atomic region may be maintained as a list of color names and levels. The list of color names may be referred to as region color names. In some embodiments, print objects may have one or more colors associated with them, along with a color level for the color. Flattener 202 determines the list of color names by analyzing each object in the set of overlapping print objects to determine which colors are in the print object, along with the color level for the colors. As a color is found in an overlapping or overlapped object, it is added to the list of color names for the region. The colors may include process colors, spot colors, or both.

Device color processor 204 receives the set of atomic regions 210 and prepares the regions for printing by determining which of the colors in a region are available on the printer and which colors are unavailable. Available colors are those that are defined to be process colors or spot colors that are available in color set 108. An unavailable color is a spot color that is not part of the colors in color set 108 for the printer. In those embodiments in which an equivalent color may be specified, a color that would otherwise be considered unavailable may be considered an available color if an equivalent available color is found. Unavailable colors may be converted to process colors. The resulting process colors may be blended into a single process color specification.

It should be noted that a spot color is used whenever possible, and conversion to a process color is only done when a particular spot color is unavailable and no equivalent is available.

Referring to the example illustrated in FIGS. 3A-3C, assume that object B has spot color 1 and that spot color 1 is available on the printer. Further assume that object C has spot color 2, and that spot color 2 is unavailable. Further assume that object A has a process color. Thus object AB is a combination of a process color and spot color 1, while object BC is a combination of spot color 1 and spot color 2. In the process described above, object A maintains its process color, object B maintains its spot color 1. Object C is converted to a process color. Object AB maintains a combination of the defined process color and spot color 1. For object BC, spot color 2 is converted to an equivalent process color as spot color 2 and is composed with spot color 1, Thus object BC will have a color list including both the equivalent process color and spot color 1.

Renderer 206 receives the objects (including the possibly converted color definitions) and converts the objects and their colors to a raster image that is then sent to printer 106.

Figure 4:
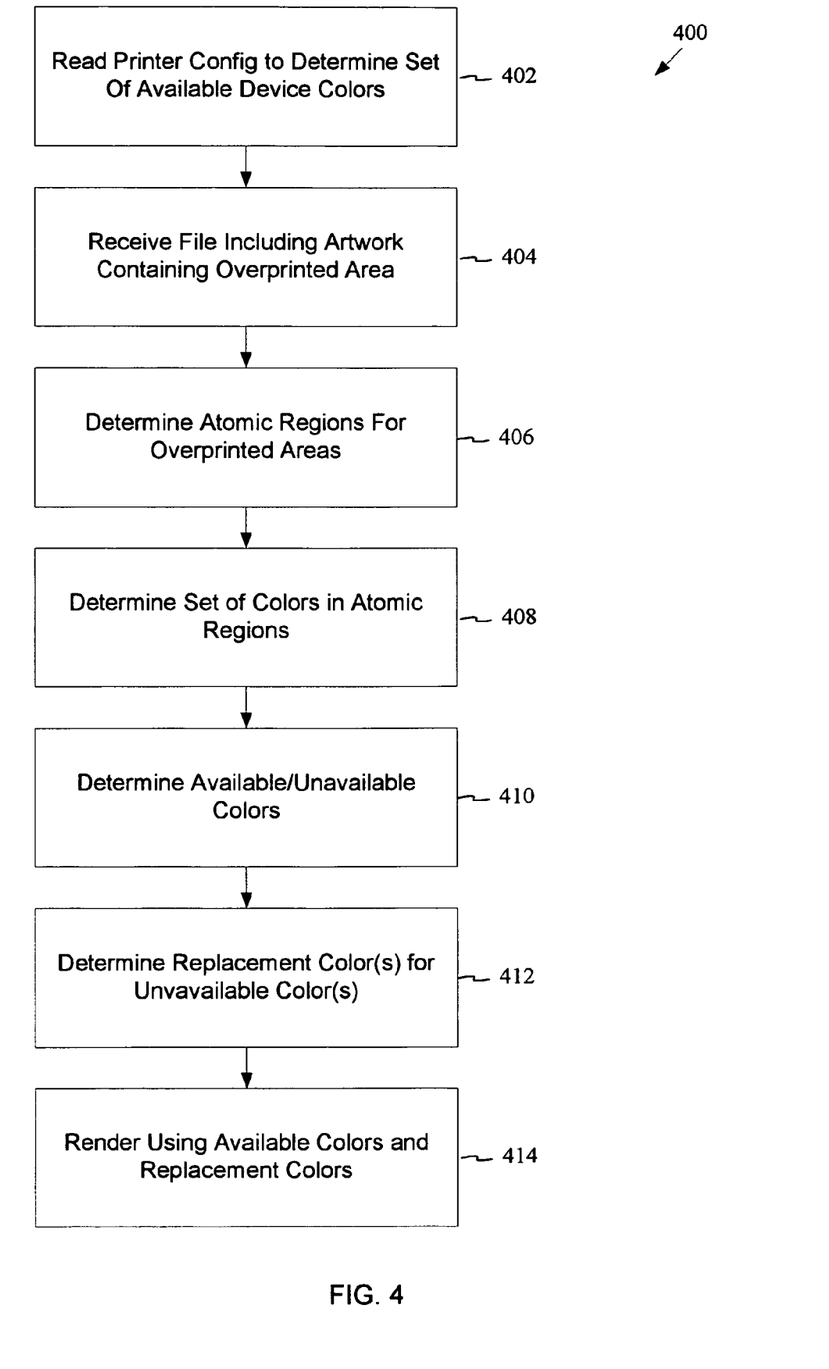
FIG. 4 is a flowchart illustrating a method for printing artwork containing overlapped inks according to an example embodiment.

Further details on the operation of the system are provided below with reference to FIG. 4. FIG. 4 is a flowchart illustrating a method for printing print objects containing overlapping inks according to an example embodiment. The method begins by reading a printer configuration to determine a set of available colorants (block 402). In an example embodiment, a print control system may read the printer configuration file when the system is initialized, when a printer becomes available, when the file is modified, or whenever an application print file is sent to the printer. As noted above, the printer configuration file will specify a set of one or more available device colors, including process colors and spot colors available on the printer.

The print control system then receives an application print file (block 404). The application print file will include data that defines objects and raster images to be printed on a printer controlled by the print control system. The application print file may be formatted to conform with a particular print file specification, for example the Postscript file format. Other file formats, such as PDF or PCL are possible and within the scope of the embodiments. The file may contain data representing overlapping objects, e.g., an overprinted area.

If overlapping areas are detected in the file, the print control system sends the application print data to a flattener that determines atomic regions for the overlapping areas (block 406). In general the atomic region will become a separate object from the two or more overlapping objects that form the overlapping region. In cases where multiple overlapping regions are formed, multiple atomic regions will be created.

The flattener then determines which colors are present in the atomic regions (block 408). The colors present may be process colors, spot colors, or combinations of process colors and spot colors. The level of each color (process and/or spot) will be determined by the transparency of the objects that overlap one another. A list of colors in the region and their intensity is associated with the atomic region. During this phase, all spot colors may be retained.

The atomic regions are then sent to a device color processor, which determines which colors in the list of colors for an atomic region are available colors, and which colors are unavailable colors (block 410). The determination is made by comparing the list of colors in the atomic regions with a list of colors provided in the printer device configuration.

The device color processor then proceeds to determine replacement colors for the unavailable colors (block 412). A replacement color may be created by using a device-specific process color to provide what the device configuration specifies as the process color equivalent to the unavailable spot color. In some embodiments, equivalent colors may be specified. In this case, unavailable spot color may be replaced by an available equivalent spot color. Spot colors that are equivalent to one another may be specified in the printer device configuration file. Alternatively, equivalent spot colors may be specified by the application print file. The available colors and any replacement colors may then be included as distinct components in the atomic region's color list to create an opaque atomic region. In some embodiments, replacement process colors may be blended into a single process color value for inclusion in the atomic region's color list.

The opaque atomic regions are then rendered to the print device (block 414).

Figure 5:
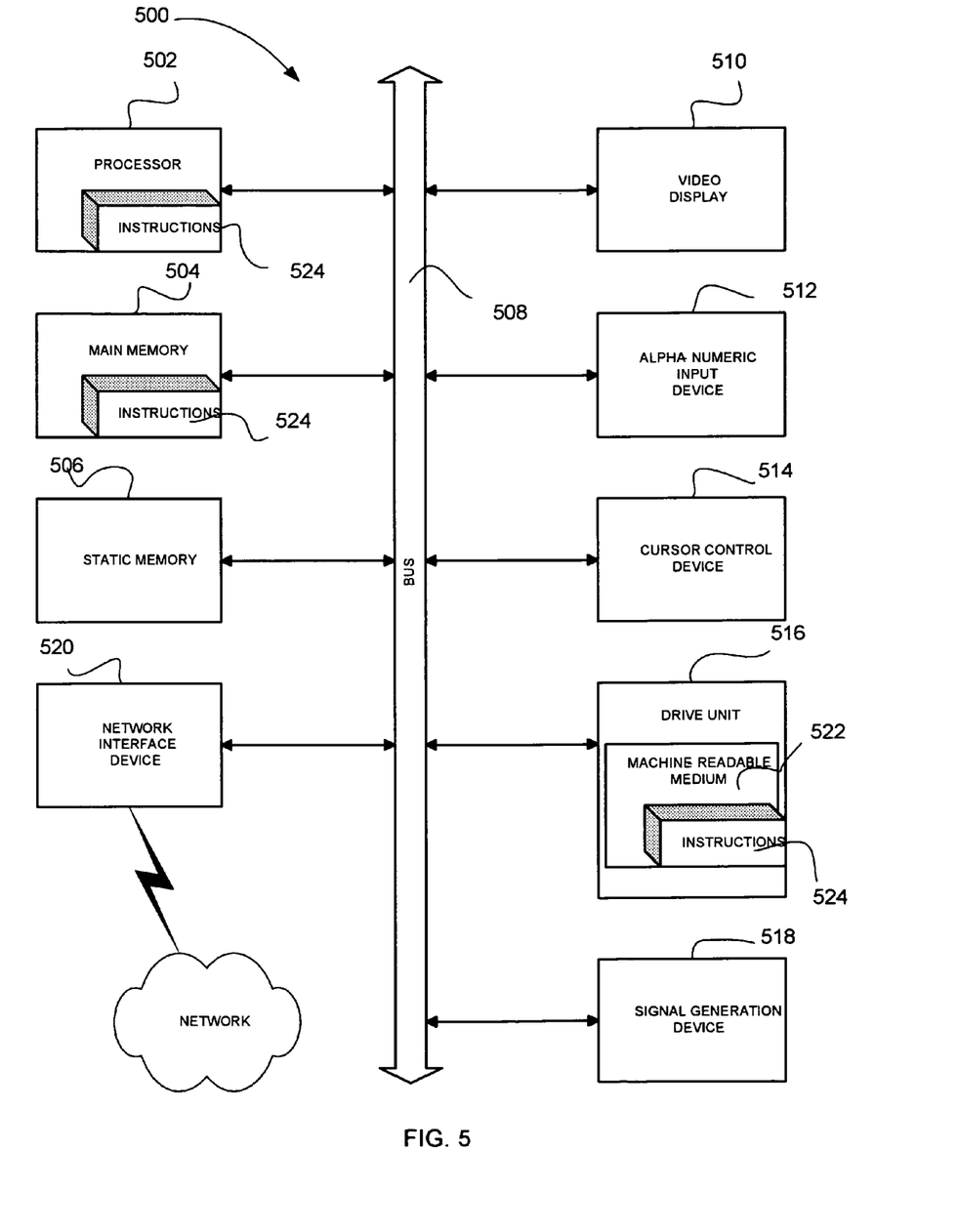
FIG. 5 is a block diagram illustrating components of a computing device that may execute systems and methods according to embodiments of the invention.

FIG. 5 is a block diagram illustrating major components of a computer system 500 within which a set of instructions, for causing the machine to perform any one or more of the methodologies discussed herein, may be executed. In alternative embodiments, the machines operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, an embedded controller, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520. The network 526 may be any type of wired or wireless network and the network interface device 520 may vary based on the type of network. In some embodiments, the network comprises a LAN (local area network). In alternative embodiments, the network may be a wide area network, a corporate network, or an intranet linking multiple networks. In further alternative embodiments, the network may comprise the Internet.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the embodiments of the invention. The term "machine-readable medium" shall accordingly be taken to included, but not be limited to, solid-state memories, optical media, and magnetic media.

Although the inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope or meaning of the claims.

What is claimed is:

1. A method comprising:
   reading a printer configuration of a printer;
   determining a set of available device colors on the printer based on the printer configuration,
      the determining of the set of available colors including creating a list of device color names,
      the set of available device colors including a particular color;
   receiving a file including print objects containing an overlapping region;
   creating an atomic region from the overlapping region;
   determining a set of print object colors found in the atomic region,
      the determining of the set of print object colors including creating an atomic region specific list of print object color names associated with the atomic region,
      the set of print object colors corresponding to the atomic region and including an unavailable color absent from the set of available device colors,
      the unavailable color being a spot color printable using a single ink,
      the single ink being unavailable on the printer;
   identifying the unavailable color by comparing, using a processor of a machine, the list of device color names to the atomic region specific list of print object color names;
   determining, using the processor of the machine, that the particular color is a replacement of the unavailable color; and
   rendering the atomic region to the printer using the particular color.

2. The method of claim 1, wherein
   the list of print object color names includes print object color intensities associated with the atomic region, the print object color intensities respectively corresponding to the print object color names.

3. The method of claim 1, wherein
   the particular color is an equivalent of the unavailable color.

4. The method of claim 3, wherein
   the printer configuration includes equivalency information describing the particular color as the equivalent of the unavailable color; and
   the identifying of the unavailable color is based on the equivalency information.

5. The method of claim 1, wherein
   the particular color is a further spot color printable using a further single ink; and
   the further single ink is available on the printer.

6. The method of claim 1, wherein
   the particular color is a process color printable using a mixture of multiple inks; and
   each of the multiple inks is available on the printer.

7. The method of claim 1, wherein
   the particular color is a color blend that includes a process color mixed with a further spot color;
   the process color is printable using a mixture of multiple inks available on the printer; and
   the further spot color is printable using a further single ink available on the printer.

8. A system comprising:
   a flattener configured to:
      receive a file including print objects;
      identify an overlapping region from the print objects;
      create an atomic region from the overlapping region; and
      create an atomic region specific list of one or more print object color names associated with the atomic region, the one or more print object color names respectively corresponding to one or more colors present in the atomic region,
         the atomic region specific list of one or more print object color names including an unavailable color name corresponding to an unavailable color that is absent from a set of available device colors available on a printer device,
         the unavailable color being a spot color printable using a single ink,
         the single ink being unavailable on the printer device;
   a device color processor embodied in an instruction processor of the system, the device color processor being configured to:
      read printer configuration data of the printer device,
         the printer configuration data describing the set of available device colors,
         the set of available device colors including a particular color and being specified as a list of device color names;
      identify the unavailable device color by comparing the list of device color names with the atomic region specific list of one or more print object color names; and
      replace the unavailable device color with the particular color in the atomic region; and
   a renderer configured to render atomic region to the printer device using the particular color.

9. The system of claim 8, wherein
   the list of print object color names includes print object color intensities associated with the atomic region, the print object color intensities respectively corresponding to the print object color names.

10. The system of claim 8, wherein
    the particular color is an equivalent of the unavailable color.

11. The system of claim 10, wherein
    the printer configuration data includes equivalency information describing the particular color as the equivalent of the unavailable color; and
    the device color processor is configured to identify the unavailable color based on the equivalency information.

12. The system of claim 8, wherein
    the particular color is a further spot color printable using a further single ink; and the further single ink is available on the printer device.

13. The system of claim 8, wherein
    the further spot color is a Pantone color.

14. The system of claim 8, wherein
    the particular color is a process color printable using a mixture of multiple inks; and
    each of the multiple inks is available on the printer device.

15. The system of claim 8, wherein
    the particular color is a color blend that includes a process color mixed with a further spot color;

the process color is printable using a mixture of multiple inks available on the printer device; and the further spot color is printable using a further single ink available on the printer device.

16. A non-transitory machine-readable medium embodying a set of instructions that, when executed by a processor of a machine, cause the machine to perform operations comprising:

reading a printer configuration of a printer;

determining a set of available device colors on the printer based on the printer configuration, the determining of the set of available colors including creating a list of device color names, the set of available colors including a particular color;

receiving a file including print objects containing an overlapping region;

creating an atomic region from the overlapping region;

determining a set of print object colors found in the overlapping atomic region, the determining of the set of print object colors including creating an atomic region specific list of print object color names associated with the atomic region, the set of print object colors corresponding to the atomic region and including an unavailable color absent from the set of available device colors, the unavailable color being a spot color portable using a single ink, the single ink being unavailable on the printer;

identifying the unavailable color by comparing the list of device color names to the atomic region specific list of print object color names;

determining that the particular color is a replacement of the unavailable color; and rendering the overlapping atomic region to the printer using the particular color.

* * * * *